United States Patent [19]

Wilwerding

[11] 4,160,904
[45] Jul. 10, 1979

[54] DIGITAL CONTINUOUS FOCUS PROPORTIONAL CONTROLLER

[75] Inventor: Dennis J. Wilwerding, Littleton, Colo.

[73] Assignee: Honeywell Inc., Minneapolis, Minn.

[21] Appl. No.: 834,852

[22] Filed: Sep. 19, 1977

[51] Int. Cl.² .............................................. G01J 1/20
[52] U.S. Cl. ..................... 250/201; 250/204; 354/25
[58] Field of Search ............... 250/201, 204, 208, 209, 250/234, 578; 354/25; 356/1, 4, 5

[56] References Cited

U.S. PATENT DOCUMENTS

| 3,274,914 | 9/1966 | Biederman et al. | 354/25 |
| 3,684,374 | 8/1972 | Humphrey | 356/4 |
| 3,783,269 | 1/1974 | McConnell | 250/201 |
| 3,836,772 | 9/1974 | Stauffer | 250/204 |
| 3,838,275 | 9/1974 | Stauffer | 250/209 |
| 3,958,117 | 5/1976 | Stauffer | 354/25 |
| 4,002,899 | 1/1977 | Stauffer | 250/201 |
| 4,010,479 | 3/1977 | Nobusawa | 354/25 |
| 4,078,172 | 3/1978 | Wilwerding | 250/201 |

Primary Examiner—David C. Nelms
Attorney, Agent, or Firm—Charles J. Ungemach

[57] ABSTRACT

A digital continuous focus proportional controller for an automatic focus system of the spatial image correlation type determines whether focus correction is needed and in which direction and moves the primary optical member or lens with a proportional drive in accordance with these determinations.

10 Claims, 4 Drawing Figures

DIGITAL CONTINUOUS FOCUS PROPORTIONAL CONTROLLER

BACKGROUND OF THE INVENTION

The present invention relates generally to apparatus for providing a measure of the distance between the apparatus and an object. In particular, the present invention is directed to an automatic focus system in which a primary optical means, such as the taking lens of a camera, is moved to maintain an image of the object in focus at the plane of the photographic film.

One highly advantageous type of automatic focus apparatus is the spatial image correlation type. Examples of the different forms of arrangements of this type can be found in copending U.S. patent application Ser. No. 700,963, filed June 29, 1976, by Norman L. Stauffer, and assigned to the same assignee as the present invention; in U.S. Pat. Nos. 3,836,772; 3,838,275; 3,958,117; and 4,002,899, by Norman L. Stauffer, and in U.S. Pat. No. 3,274,914 by K. Biedermann, et al.

In my copending application Ser. No. 743,189, filed Nov. 19, 1976, now U.S. Pat. No. 4,078,172 issued Mar. 7, 1978 and assigned to the assignee of the present invention, I provide a continuous automatic focus system that produces an operation that occurs only with respect to the position of the major extremum to supply an accurate focus correction signal and to drive the lens in an appropriate direction to achieve proper focus. In my copending application Ser. No. 804,111, filed June 6, 1977, I provide an improved continuous automatic focus system which permits proportional control, that is, driving of the motor to position the lens at relatively high rates for large errors and reducing the speed of the motor at small errors to prevent overshoot and focus oscillation. In my copending application, Ser. No. 834,760 filed on even date herewith, I provide a further improved continuous focus proportional controller which allows the lens drive motor to operate during both the scan and return portions of the cycle and even continuously for large focus errors and which provides a small minimum drive pulse near the zero focus error, thus overcoming the static friction in the lens drive. The system also provides for characterization of the scan cycle so that the scanning mirror may actively scan the field of view during a larger portion of the cycle than was possible in the previous systems and provides means overcoming the problems associated with switch contact bounce so that only the initial closure of mechanical switches involved in the system operate to produce the control effects desired.

SUMMARY OF THE INVENTION

The present invention is a further improved continuous focus proportional controller having the advantages found in my previous applications and in the prior art and, in addition, providing for unique digital operation not previously found in the prior art which reduces the number of external components necessary and provides other advantages commonly associated with digital operation.

Briefly, my present invention involves logic circuits similar to those found in my copending application serial number but which utilizes timers or counters connected to the outputs to determine the time or distance between the major extremum or highest peak in the correlation signal and the point where the relative position switch or window switch closes. This determination provides a signal indicative of the error between the present position of the taking lens and the desired position for proper focus. The signal is presented to a lens drive means which, acting in combination with the signal from the logic circuitry indicative of the direction of error, operates to move the lens towards the correct focus position.

DETAILED DESCRIPTION OF THE PREFERRED EMBODIMENTS

Figure 1:
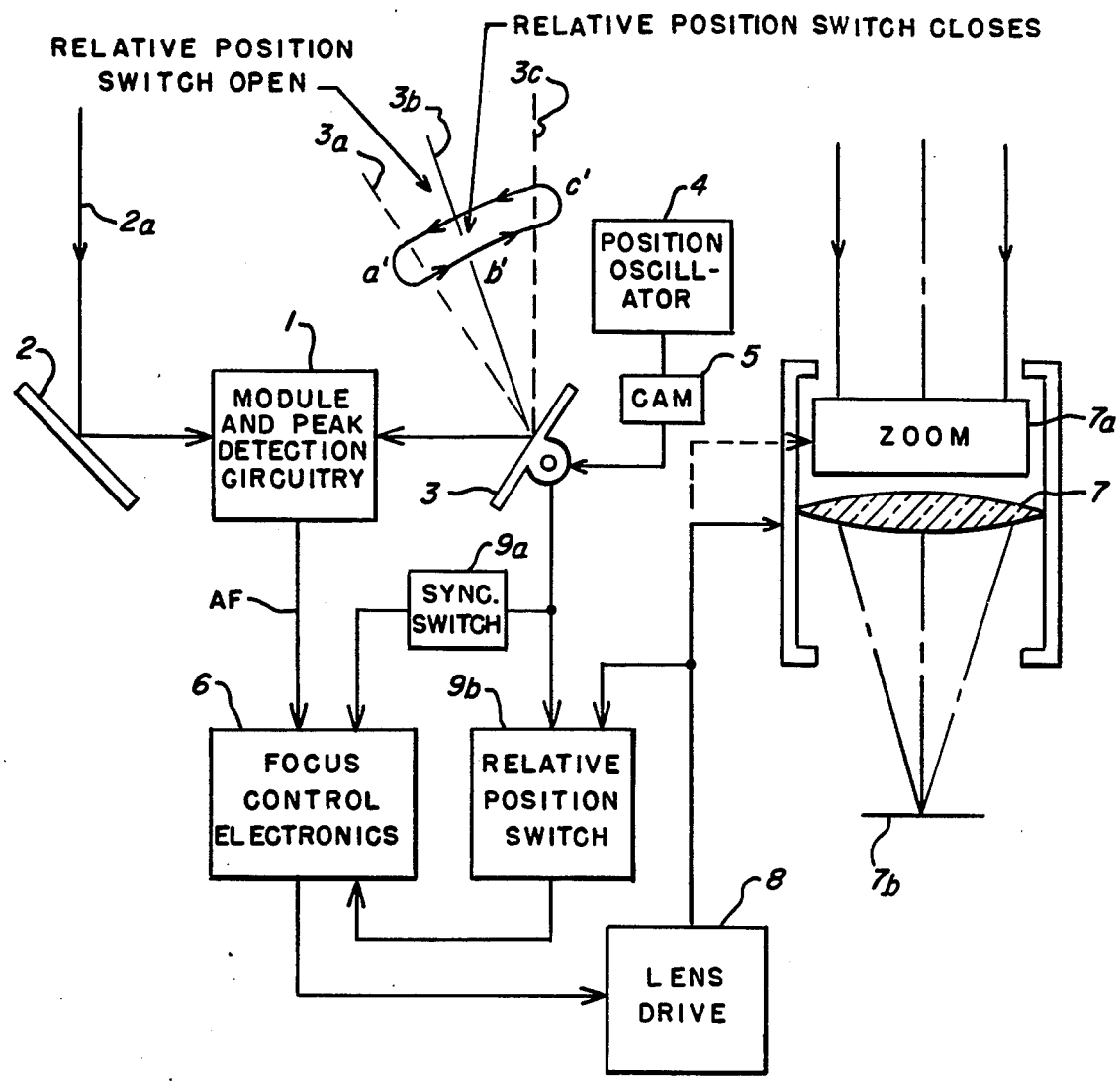
FIG. 1 shows a block diagram of the continuous focus proportional control system of the present invention.

In FIG. 1, the system includes a module or peak detection circuitry block identified by reference numeral 1, which may be like that described in the above-mentioned co-pending application Ser. No. 804,111. Mirrors 2 and 3 are shown with mirror 3 being rotatable about an axis perpendicular to the plane of FIG. 1. Mirror 2 provides an optical path 2a for radiation to travel from the field of view being scanned to module 1 and mirror 3 provides an optical path to module 1 for radiation from the field of view at various positions therein depending upon the angular position of mirror 3. Three of these optical paths are shown as 3a, 3b and 3c, respectively, in FIG. 1.

A position oscillator, or drive mechanism 4, is shown operating through a cam or other motion characterizing means 5 to move mirror 3 back and forth across the field of view being scanned. The purpose of cam 5 is to cause the scan of mirror 3 to be characterized in such a way that it will move more rapidly during its return motion back to the initial starting position than it does during the active scan portion of its cycle. If both the active and return scans are desired to be at the same speed then cam 5 would not be necessary or if it were desired, the return portion could be made larger by different characterization of cam 5.

Module 1 receives the radiation from mirrors 2 and 3 and determines where the best correlation of radiation on detectors in the module occurs so as to produce an autofocus signal which will change from a low level or "0" magnitude to a high level or "1" magnitude whenever an extremum, a valley or a peak, in the correlation signal occurs. Since there may be several extremums encountered during a single scan, the autofocus signal may change from a "1" back to a "0" and back to a "1" several times during a single scan but the last of the transitions from "0" to "1" is indicative of the major extremum and thus of the actual desired focus position. All of this is more completely described in the above-mentioned copending application, Ser. No. 804,111, and in the above-mentioned Stauffer U.S. Pat. No. 4,002,899 and, for purposes of the present application, the extremums in the correlation signal will be presumed to be peaks.

In FIG. 1, the autofocus signal is shown being presented from module 1 to focus control electronics 6, the operation of which will be explained in detail hereinafter. The output of the focus control electronics 6 is a signal consisting of a plurality of pulses whose widths change with the amount of focus error between the present position of a lens 7, which may include zoom optics 7a, and the desired position of such lens in order to provide a properly focused image of an object in the field of view upon a plane 7b which may be the plane of a film of a camera. This signal consisting of pulses of varying width from the focus control electronics 6 is presented to a lens drive mechanism or motor 8, whose output is connected by gears or other drive means to the lens 7 and zoom optics 7a for purposes of properly positioning them.

As mirror 3 moves through the field of view being scanned, a sync switch 9a will produce a signal at both the start and the finish of the active portion of the scan. Thus, in FIG. 1, if mirror 3, starts from a position a', which is a little nearer than the position where radiation from a very near object moves along path 3a to module 1, sync switch 9a will produce a signal which may be in the form of a transition from "0" to "1". When mirror 3 has moved to a position c', which is a little further than the position where it is receiving radiation from a very far object or at infinity along a path such as 3c, sync switch 9a will produce a signal such as a transition from "1" back to a "0". Thus, the focus control electronics is aware of the beginning and the end of each active scan cycle. The mirror 3 may then be returned to its initial starting position and, as shown in FIG. 1, may continually oscillate from a position a' to position c' and back. Somewhere in its travels between positions a' and c', mirror 3 will occupy a position b' in which it is receiving radiation from some portion of the field of view indicative where the lens 7 and zoom optics 7a may be focusing. In this position, radiation from the field of view travels along path 3b to module 1. At this point in its travel, the relative position or "window" switch 9b, which is shown connected to both the lens drive mechanism 8 and the mirror 3, produces a signal which is presented to the focus control electronics 6. As indicated in the upper part of FIG. 1, the relative position switch will be open between points a' and b' in the cycle but will close at position b' and remain closed during the cycle from position b' through position c' until it again arrives at position b' in the return portion of the cycle where it will again open. The signal to the focus control electronics may be a "1" whenever the relative position switch is open and may be a "0" whenever the relative position switch is closed. The sync switch 9a and relative position or "window" switch 9b may take a variety of different forms, depending upon the particular mechanical embodiment of the lens drive 8 and position oscillator 4 but should be able to operate for many cycles and should be capable of factory adjustment so as to permit system alignment. An example of a switch which may be used may be found in the above-mentioned Stauffer application, Ser. No. 700,963.

Figure 2:
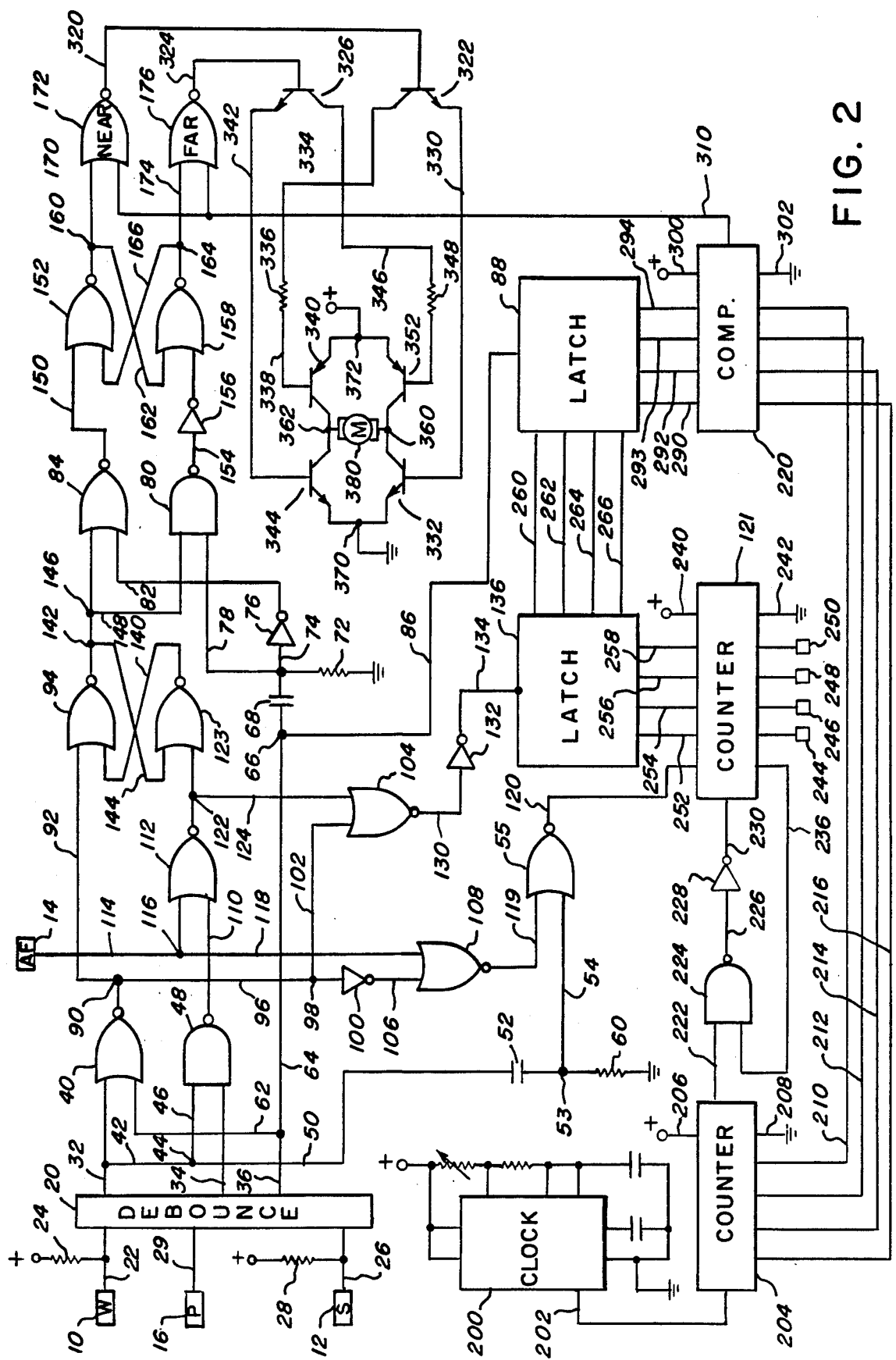
FIG. 2 is a schematic diagram of the continuous focus proportional control electronics of the present invention.

FIG. 2 shows a schematic diagram of the preferred embodiment of the continuous automatic focus proportional controller electronics of the present invention. A terminal 10 is shown as a box containing the letter "W", representing the input from the "window" or relative position switch 9b of FIG. 1, a terminal 12 is shown as a box containing the letter "S", representing the input from the "sync" switch of FIG. 1 and a terminal 14 is shown as a box with the letters "AF" representing the autofocus signal from the module 1 of FIG. 1.

Also shown in FIG. 2 is a terminal 16 which is shown as a box containing the letter "P". This terminal is connected to the detector output of the peak detection circuitry described in the above-mentioned copending application Ser. No. 804,111. Terminal 16 is an output of the present invention, the purpose of which is to remove the charge on the holding capacitor of the system whenever the sync switch operates at the completion of the scan and will not be further described herein.

The system of FIG. 2 will utilize the signals appearing on terminals 10, 12 and 14, to drive a motor in a first or second direction so that the primary optical element or lens of the system, such as a camera, may be positioned for best focus.

FIG. 2 also shows a box identified by reference numeral 20 and containing the word "DEBOUNCE". The circuitry in "DEBOUNCE" box 20 may be the same as that shown in my copending application Ser. No. 834,760, which comprises a pair of cross-coupled flip-flop circuits, the purpose of which is to permit only the initial contact closure of the "window" switch and "sync" switch 10 and 12 to effect the logic circuitry of the system. Any additional signals that may occur as, for example, by the switch contacts bouncing subsequent to their initial contact, will be blocked and will not have an effect on the balance of the system.

As seen in FIG. 2, terminal 10 is connected to the "DEBOUNCE" circuitry 20 by a conductor 22 and through a resistor 24 to the system source of positive potential. In similar manner, terminal 12 is connected to the "DEBOUNCE" circuitry 20 by a conductor 26 and through a resistor 28 to the system source of positive potential. Terminal 16 is connected to the "DEBOUNCE" circuitry 22 by a conductor 29.

The output signals which are utilized in the present invention from the "DEBOUNCE" circuitry appear on conductors 32, 34 and 36, respectively. Output conductor 32 carries a signal from the "DEBOUNCE" circuitry which is a "0" whenever the "window" switch is open and a "1" signal appears on conductor 22 and vice versa. In other words, after any bouncing of the switch contacts, the signal on conductor 32 will always be opposite to the signal on conductor 22. The output appearing on conductor 34 will be a "1" whenever the "sync" switch is open and a "1" signal appears on conductor 26 and vice versa. In other words, after any bouncing of the switch contacts the signal on conductor 34 will always be the same as the signal on conductor 26. The signal on output 36 will be a "0" whenever the "sync" switch is open and a "1" appears on conductor 26 and vice versa. In other words, the signal on conductor 36 will always be opposite to the signal on conductor 26.

Conductor 32 is shown connected to one input terminal of a NOR gate 40 and, by means of a conductor 42, to a junction point 44. Junction point 44 is connected by a conductor 46 to one input terminal of a NAND gate 48 and by means of a conductor 50 to one terminal of a capacitor 52, the other terminal of which is connected to a junction point 53. Junction point 53 is connected by a conductor 54 to one input terminal of a NOR gate 55 and, through a resistor 60, to signal ground for the system. Conductor 34 is connected to the other input terminal of NAND gate 48. Conductor 36 is connected by a conductor 62 to the other input terminal of NOR gate 40 and by a conductor 64 to a junction point 66. Junction point 66 is connected to one terminal of a capacitor 68, the other terminal of which is connected to a junction point 70. Junction point 70 is connected by a resistor 72 to signal ground, by a conductor 74 to the input terminal of an inverter 76 and by a conductor 78 to one input terminal of a NAND gate 80. The output of inverter 76 is connected by a conductor 82 to one input terminal of a NOR gate 84. Junction point 66 is also connected by a conductor 86 to the input terminal of a storage register or latch 88.

The output of NOR gate 40 is connected to a junction point 90 and, via conductor 92, to one input terminal of a NOR gate 94. Junction point 90 is also connected by a conductor 96 to a junction point 98. Junction point 98 is connected to the input of an inverter 100 and via conductor 102 to one input terminal of a NOR gate 104. The output of inverter 100 is connected by a conductor 106 to one input terminal of a NOR gate 108.

The output of NAND gate 48 is connected by a conductor 110 to one input terminal of a NOR gate 112.

The "autofocus" terminal 14 is connected by a conductor 114 to a junction point 116. Junction point 116 is connected to the other input terminal of NOR gate 112 and by a conductor 118 to the other input terminal of NOR gate 108. The output of NOR gate 108 is connected by a conductor 119 to the other input terminal of NOR gate 55 and the output of NOR gate 55 is connected by a conductor 120 to the reset input of a counter 121.

As will be seen hereinafter, counter 121 is used as a timer between certain events and it should be understood that other forms of timers may also be employed. Accordingly, as used throughout this application, the word "counter" is intended to include other timers capable of providing the same function.

The output of NOR gate 112 is connected to a junction point 122, which is connected to one input terminal of a NOR gate 123 and via a conductor 124 to the other input terminal of NOR gate 104.

The output of NOR gate 104 is connected by a conductor 130 to the input of an inverter 132, the output of which is connected by a conductor 134 to the input of a storage register or latch 136.

NOR gates 94 and 123 are cross-connected to form a latch circuit with the output of NOR gate 123 connected by a conductor 140 to the other input of NOR gate 94 and the output of NOR gate 94 connected to a junction point 142 and from there via conductor 144 to the other input terminal of NOR gate 123. Junction point 142 is connected to a junction point 146 and from there to the other input terminal of NOR gate 84. Junction point 146 is also connected by a conductor 148 to the other input terminal of NAND gate 80.

The output of NOR gate 84 is connected by a conductor 150 to one input terminal of a NOR gate 152 while the output of NAND gate 80 is connected by a conductor 154 to the input of an inverter 156, the output of which is connected to one input terminal of a NOR gate 158. NOR gates 152 and 158 are also connected as a latch circuit with the output of NOR gate 152 being connected to a junction point 160 and from there by a conductor 162 to the other input terminal of NOR gate 158 while the output of NOR gate 158 is connected to a junction point 164 and from there by a conductor 166 to the other input terminal of NOR gate 152.

Junction point 160 is connected by a conductor 170 to one input terminal of a NOR gate 172, while junction point 164 is connected by a conductor 174 to one input terminal of a NOR gate 176. NOR gates 172 and 176 will operate, as will be described in detail hereinafter, to provide a direction signal for the lens drive mechanism so that upon the occurrence of an error, the lens will be moved towards the proper focus position. To this end, NOR gate 172 has been labelled with the word "NEAR" to indicate that when it produces a "1" signal at its output, the drive mechanism will operate to move the lens from a far position towards a near position. In like manner, NOR gate 176 has been labelled with the word "FAR" to indicate that when it produces a "1" output, it will cause the drive mechanism to move the lens from a near position towards a far position.

In the far left hand portion of FIG. 2, a clock circuit identified by reference numeral 200 is shown which produces an output on a conductor 202 to the input of a counter 204. Counter 204 has a connection by a conductor 206 to the source of positive potential for the system and has a connection by a conductor 208 to signal ground for the system. Counter 204 produces a digital signal, which may be a binary count, on conductors 210, 212, 214 and 216, which, in turn, are connected to the input terminals of a comparator 220 identified by the word "COMP." Although counter 204 and counter 121 are shown with four output conductors which provide a count, in binary code, up to the level of 15, counters with counting capabilities higher or lower than this may, of course, be employed.

Each time counter 204 goes through a cycle counting from zero to fifteen, a signal is produced on a conductor 222, which is presented to one input terminal of a NAND gate 224. The output of NAND gate 224 is connected by a conductor 226 to the input of an inverter 228, the output of which is connected by a conductor 230 to an input of counter 121. One output of counter 121 is connected by a conductor 236 to the other input terminal of NAND gate 224.

Counter 121 has a connection via a conductor 240 to the source of positive potential for the system and via a conductor 242 to signal ground for the system. Counter 121 is also shown with four terminals identified by reference numerals 244, 246, 248 and 250, the purpose of which is to provide a minimum pulse width program for the system, as will be described in further detail hereinafter.

Counter 121 also has four conductors leading therefrom identified by reference numerals 252, 254, 256 and 258, to inputs of latch 136. Latch 136 receives and stores the count from counter 121 via conductors 252, 254, 256 and 258 at appropriate times during the sequence of operation for purposes to be described hereinafter.

Latch 136 also has four outputs appearing on conductors 260, 262, 264 and 266, which are connected to inputs of latch 88. Latch 88 receives and stores the count from latch 136 at appropriate times during the sequence of operation of the system as will be described hereinafter in greater detail.

Latch 88 provides outputs on conductors 290, 292, 294 and 296, respectively, to inputs of comparator 220. Comparator 220 also has a connection by a conductor 300 to the source of positive potential for the system and by a conductor 302 to signal ground for the system. As will be explained in greater detail hereinafter, comparator 220 compares the signal from latch 88 with the signal from counter 204 so as to produce an output on a conductor 310 which is connected to the other input terminals of NOR gates 172 and 176, respectively.

The output of NOR gate 172 is connected by a conductor 320 to the base of an NPN transistor 322, while the output of NOR gate 176 is connected by a conductor 324 to the base of an NPN transistor 326.

The emitter of transistor 322 is connected by a conductor 330 to the base of an NPN transistor 332 while the collector of transistor 322 is connected by a conductor 334, a resistor 336, and a conductor 338, to the base of a PNP transistor 340.

The emitter of transistor 326 is connected by conductor 342 to the base of an NPN transistor 344, while the collector of transistor 326 is connected by a conductor 346, a resistor 348 and a conductor 350 to the base of a PNP transistor 352.

The collectors of transistors 332 and 352 are connected together at a junction point 360, while the collectors of transistors 340 and 344 are connected together at a junction point 362. The emitters of transistors 332 and 344 are connected together at a junction point 370, which is connected to signal ground for the system, while the emitters of transistors 340 and 352 are connected together at junction point 372, which is connected to the source of signal supply for the system. A motor 380 is connected between junction points 360 and 362 and operates through a connection, not shown, in FIG. 2, to drive the lens or primary optical member of the system towards the direction of proper focus.

OPERATION OF THE DIGITAL CONTINUOUS FOCUS PROPORTIONAL CONTROLLER ELECTRONICS OF FIG. 2

Figure 3:
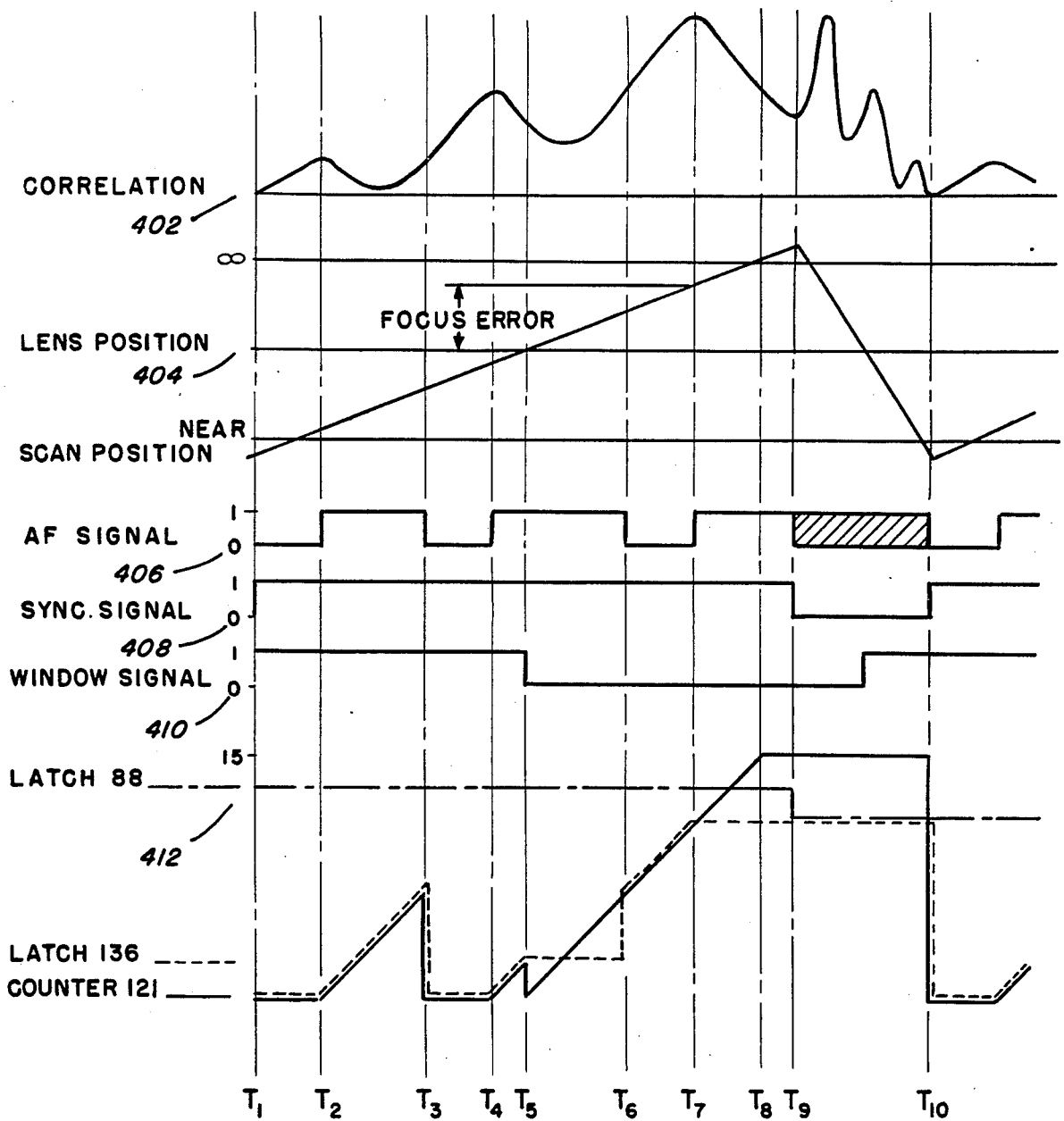
FIG. 3 shows the waveforms associated with the operation of FIG. 2.
Figure 4:
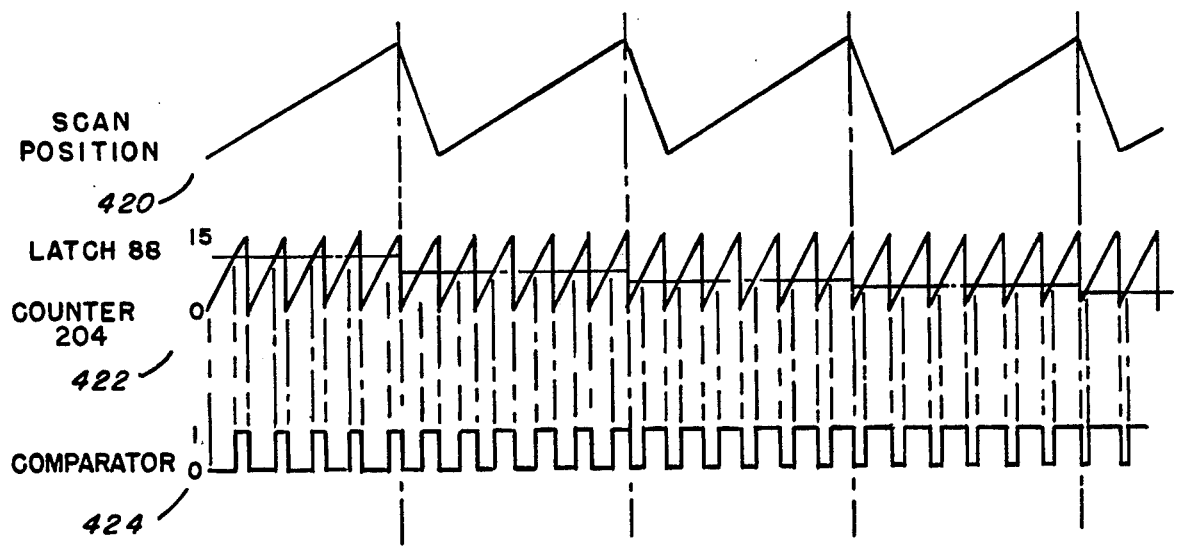
FIG. 4 shows the waveforms associated with the output of the comparator of FIG. 2 which operates to motivate the lens drive means.

The operation of FIG. 2 will be considered in conjunction with the waveforms found in FIGS. 3 and 4. The waveforms of FIG. 3 comprise a plurality of vertically arranged graphs divided off into time segments identified by the letters $T_1$ through $T_{10}$. The upper graph shows the correlation signal and is identified by reference numeral 402. This signal is seen to have several peaks between times $T_1$ and $T_9$, the active portion of the scan, and a similar number of peaks compressed between times $T_9$ and $T_{10}$, representing the return portion of the scan cycle. The highest peak in the correlation signal, that occurring at time $T_7$, represents the highest correlation and thus the position of proper focus for the system.

The second vertically arranged graph is identified by reference numeral 404 and shows the scan position of the mirror 3 in FIG. 1 as it travels from a little closer than the "near" position to a little further than the far or "∞" position. At some portion during the scan from near to far, the mirror 3 will occupy a position corresponding to the lens position, and this has been shown in FIG. 3 as the point occuring at time $T_5$ indicative of the lens position. It is seen that the difference between the position at time $T_5$ and that at time $T_7$ representing the maximum correlation position or best focus position represents the "focus error" shown on the graph.

The third graph shown in FIG. 3 is identified by reference numeral 406 and shows the autofocus signal appearing at terminal 14 in FIG. 2. It is seen that this signal changes from a "0" to a "1" each time the correlation signal of graph 402 reaches a peak and then switches back from a "1" to a "0" each time the signal again rises to the previous peak level, indicating that a new and higher peak is approaching. By this means, the last transition from a "0" to a "1" occurs at time $T_7$, which is representative of the position of the maximum correlation signal and thus the best focus position in the scene being scanned. The autofocus signal which exists after time $T_9$, the end of the active scan, has been shown in cross-hatched form to indicate that it does not matter to the system whether this signal is a "1" or a "0" during the return scan.

The fourth graph in FIG. 3 is identified by reference numeral 408 and is the "sync" signal appearing at terminal 12 of FIG. 2. It is seen that this signal is a "1" for the entire active portion of the scan between times $T_1$ and $T_9$ and then moves to a "0" during the return portion of the scan between times $T_9$ and $T_{10}$. Thus, the system by receiving a "1" from the "sync" terminal 12 is enabled to know that the active scan of mirror 3 of FIG. 1 is in progress while by receiving a "0" knows that the return or inactive portion of the scan is occurring.

The fifth graph in FIG. 3 identified by reference numeral 410 is the relative position or "window" signal appearing at terminal 10 of FIG. 2. It is seen that this signal is a "1" between times $T_1$ and $T_5$, which is representative of the lens position and becomes a "0" between times $T_5$ and sometime between times $T_9$ and $T_{10}$. Thus, the system knows that during the active portion of the scan when it receives a "1", the scan mirror 3 of FIG. 1 is occupying a position between a' and b' in FIG. 1, which is the near portion of the scan, and that when it receives a "0" signal, the mirror is in a position between b' and point c', or the far portion of the active scan. On the return portion of the scan, the signal may return to a "1" when mirror 3 again passes position b' in FIG. 1 but other positions for switch back during the return portion of the scan may also be employed.

The last graph shown on FIG. 3 is identified by reference numeral 412 and shows the signals or counts which appear on counter 121 and latches 136 and 88, respectively, at various times during the operation of the system.

FIG. 4 shows three vertically arranged graphs, the first identified by reference numeral 420 shows four cycles of scan of mirror 3 in FIG. 1. The second graph identified by reference numeral 422 shows the count of counter 204 as a sawtooth form in which there are about six complete count cycles between zero and the 15, which has been arbitrarily chosen as the counter's capacity, for each of the complete scans of mirror 3 shown in graph 420. While about six cycles of counter operation have been shown for each scan cycle, it should be understood that there will normally be many more than six complete operations of counter 204 during a single scan cycle but showing a large number in FIG. 4 would unnecessarily complicate the drawing and explanation. Superimposed upon the counter 204 saw-tooth form is a dash-dot line indicating the level or count that is being held by latch 88.

The last graph of FIG. 4 identified by reference numeral 424 is a sort of square waveform indicating the output of comparator 220 of FIG. 2. It is seen that this waveform switches from a "1" to a "0" during those periods of time where the count of counter 204 is lower than the count held by latch 88 and switches from a "0" to a "1" when the count of counter 204 is greater than the count held by latch 88. It is also seen that going across from left to right in FIG. 4 for each scan position, the level of latch 88 in graph 422 drops somewhat so that the width of the "0" portions of the output of the comparator 220 becomes less and less until finally only a small "0" width is available on the right hand side of FIG. 4. The purpose of this is to cause operation of motor 380 in FIG. 2 to be faster when the error is greater and to be slower when the error is small, and thus provide a proportional system.

Referring now again to FIG. 2 and FIG. 3, it will be seen that at time $T_1$, the signal from the "window" terminal 10 is a "1", the signal from the "sync" terminal 12 is a "1", and the signal from the "autofocus" terminal 14 is a "0".

Through the operation of the "DEBOUNCE" circuitry 20, which is explained in detail in the above-mentioned copending application Ser. No. 834,760, the signal on line 32 is a "0", the signal on conductor 34 is a "1" and the signal on conductor 36 is a "0". Since both conductors 32 and 36 carry "0" signals, the two inputs to NOR gate 40 are "0"'s and the output of NOR gate 40 appearing at terminal 90 is a "1". The signal on conductor 96 being a "1", provides a "0" signal on conductor 106, after passing inverter 100. Since, as mentioned, the autofocus signal is a "0", the two inputs to NOR gate 108 are "0"'s and thus the output of NOR gate 108 appearing on conductor 119 is a "1".

The signal on conductor 50 to capacitor 52 is a "0" and the signal appearing at terminal 53 and on conductor 54 will also be a "0". As a matter of fact, the only time there will be a "1" signal at terminal 53 and on conductor 54 will be for a short period of time after there is a change from a "0" to a "1" on line 50. Because of capacitor 52 that "1" signal on conductor 54 will return to a "0" signal by itself shortly afterwards.

The inputs to NOR gate 55 are therefore a "1" and a "0" and, accordingly, the output of NOR gate 55 on conductor 120 will be a "0". Counter 121 is therefore reset to zero or its preset base value established by signals on terminals 244–250, if such is employed, will not begin counting until there is a "1" signal on conductor 120 and, accordingly, as seen in FIG. 3, the count in counter 121 remains at "0" between times $T_1$ and $T_2$. If a preset base were used, the level of count for counter 121 in FIG. 3 would be at a higher level by the amount of count supplied to terminals 244–250.

The "1" signal on conductor 92 at time $T_1$ is presented to NOR gate 94 and, accordingly, the output of NOR gate 94 at terminals 142 and 146 will be a "0". This signal is presented to NOR gates 84 and 123 and to NAND gate 80.

Since the signals on conductors 34 and 46 are a "1" and a "0", respectively, the output of NAND gate 48 is a "1" appearing on conductor 110. Since the "autofocus" signal on terminal 14 is a "0" at time $T_1$, the two inputs to NOR gate 112 are a "1" and a "0", so that its output appearing at terminal 122 is a "0". This provides two "0" input signals to NOR gate 123, which causes its output on conductor 140 to be a "1" and the latch circuit comprising NOR gates 94 and 123 is in a state that will continue to produce a "0" at terminal 146.

NOR gate 104 receives the "1" signal from the output of NOR gate 40 via conductors 96 and 102 and receives the "0" input from NOR gate 112 via conductor 124. Accordingly, the output of NOR gate 104 will be a "0" appearing on conductor 130 and the signal on conductor 134 after inverter 132 will be a "1". A "1" signal input to latch 136 causes it to "load" from counter 121 which, as mentioned above, is not counting between times $T_1$ and $T_2$. Accordingly, latch 136 will receive a zero count, or other base count supplied to terminals 244–250 if such are used, from counter 121 and, as seen in FIG. 3, will also remain at counter 121's level for this time period.

The "0" signal on conductor 64 is presented to the input of latch 88 and, accordingly, latch 88 will not "load" from latch 136 but will rather remain at the level it had previously attained, which is shown in FIG. 3 at about a count of 12.

The "0" signal on conductor 64 produces a "0" signal at terminal 70 which, like junction point 53, will only become a "1" for a short period of time following a transition at junction point 66 from a "0" to a "1" with a "0" on conductor 78, the inputs to NAND gate 80 are both "0"'s, thus producing a "1" output on conductor 154 and a "0" input to NOR gate 158, after inverter 156.

The signal on the other side of inverter 76 will be a "1", which signal is presented by conductor 82 as the other input to NOR gate 84. Since the inputs to NOR gate 84 are a "1" and a "0", its output will be a "0" on conductor 150.

Because the present lens position is shown to be on the near side of the correlation or proper focus position, the motor is driving the lens from "near" towards "far" and so the latch circuit comprising NOR gates 152 and 158 is set with the output of NOR gate 152 a "1" appearing at terminal 160 and on conductors 162 and 170 and the output of NOR gate 158 is a "0" appearing at terminal 164 and on conductors 166 and 174. As will be later explained, the output from comparator 220 is a pulsating "0" signal. This "0" signal forms the lower inputs to NOR gates 172 and 176, with the result that the output of NOR gate 172 is a "0", while the output of NOR gate 176 is a pulsating "1". This has the effect of turning transistor 326 on and off while leaving transistor 322 in an off condition.

When transistor 326 is on, the transistors 344 and 352 are turned on so that a current path is formed from the source of positive potential for the system to junction point 372, through transistor 352 to junction point 360, through motor 380 to junction point 362, through transistor 344 to junction point 370 and to system ground. The pulsating current through motor 380 from junction point 360 to junction point 362 operates to drive motor 380 in a direction to cause the lens of the system to move towards infinity position and at a speed which is dependent upon the length of the pulses.

At time $T_1$ and throughout the entire operation of the system, clock 200, which may be a standard 555 timer, is providing a signal to counter 204, which causes it to count up to its limit assumed herein to be 15, over and over again at a fairly rapid rate. Counter 204's count at any time will appear on conductors 210–216.

An output from counter 204 is a signal appearing on line 222 as the upper input to NAND gate 224. The signal on this line will be a "1" during the time that counter 204 is counting between 0 and 15 and at the end of this cycle, the signal appearing on line 222 will be a "0". Thus, after every cycle of counter 204, a "0" signal appears on conductor 222 for a short period of time. A similar output from counter 121 appears on line 236. Thus, for the first 15 counts of counter 204, both inputs to NAND gate 224 are "1"'s, the signal on line 226 will be a "0" and the signal on line 230 after inverter 228 will be a "1". At the end of 15 counts of counter 204, the signal on line 222 goes to a "0", at which time the output of NAND gate 224 will become a "1" on line 226 and the signal on line 230, after inverter 228 will be a "0". A "0" on conductor 230 causes counter 121 to advance one count with the result that counter 121 counts at a rate about 15 times slower than counter 204. Furthermore, when counter 121 has reached the count of 15, the output on conductor 236 will become a "0" and when counter 204 next counts past 15, the two inputs to NAND gate 224 will both be "0", at which time counter 121 stops counting until it is reset by a "0" signal on conductor 120.

The count in counter 204 may be presented in binary form on lines 210, 212, 214 and 216 to the comparator 220 which, as mentioned above, compares the magnitude of this signal with that coming from latch 88 and produces a pulsating "0" on line 310 so as to cause actuation of the motor 380.

In the following discussion of operation at the various times $T_2$ through $T_{10}$, only the changes that occur in the circuit will be mentioned.

At time $T_2$, a first correlation peak has been reached as can be seen from curve 402 in FIG. 3 at which time, as seen on curve 406 of FIG. 3, the autofocus signal changes from a "0" to a "1". With a "1" appearing at the autofocus terminal 14 of FIG. 2, the output of NOR gate 112 will not change since the lower input terminal thereof was already receiving a "1" prior to time $T_2$. The right side input to NOR gate 108 will become a "1" and since the left side input to NOR gate 108 was previously "0", the output of NOR gate 108 will change to a "0", thus providing two "0" inputs to NOR gate 55, whose output now changes to a "1". With a "1" on conductor 120, counter 121 is activated to begin counting as is seen by Graph 412 in FIG. 3. The input to latch 136 remains a "1" and, accordingly, latch 136 is loaded by and follows counter 121 as is also seen in Graph 412 of FIG. 3.

At time $T_3$, the correlation signal has progressed down from the previous peak back up towards a new peak and has reached the level of the previous peak indicating that the new peak approaching will be higher than the previous peak. The autofocus signal therefore returns from a "1" to a "0" which has the effect of returning the circuit of FIG. 2 to its condition previous to time $T_2$. In other words, the signal on autofocus terminal 14 will be a "0", which will have no effect on NOR gate 112, since its lower input continues to receive a "1" but which will produce a change in output of NOR gate 108, since both of its inputs are now again "0". The output of NOR gate 108 will again become a "1", thus producing a change in output of NOR gate 55 back to a "0". With a "0" input on conductor 120, counter 121 is again reset and returns to the "0" level as seen by Graph 412 in FIG. 3. Since latch 136 continues to receive a "1" signal on conductor 134, it continues to follow counter 121 with the result that it also returns to a "0" condition in FIG. 3.

At time $T_4$, the correlation signal has again reached another peak, as seen in Graph 402 of FIG. 3, with the result that the autofocus signal in Graph 406 of FIG. 3 again changes from a "0" to a "1" and the situation which occurred at time $T_2$ repeats. In other words, the autofocus signal on terminal 14 of FIG. 2 will again become a "1", which, as before, has no effect on the output of NOR gate 112, since it is still receiving a "1" on its lower terminal but which does produce a change in the output of NOR gate 108 from a "1" to a "0". This change again produces a "1" signal on conductor 120 and causes counter 121 to begin counting again with latch 136 following.

At time $T_5$, the scan of the mirror 3 of FIG. 1 has reached a position where it corresponds with the present position of the lens 7 and 7a and this produces the closing of the "window" switch. The result of this in FIG. 2 is to change the signal from the "window" terminal 10 from a "1" to a "0" and to thus produce a "1" signal on conductor 32. This has several effects in the system of FIG. 2. First, the change from a "0" to a "1" on the upper terminal of NOR gate 40 causes its output to switch from a "1" to a "0" and this changes the signal to the upper input terminal of NOR gate 94, thus "enabling" the latch circuit consisting of NOR gate 94 and NOR gate 123 but producing no change in output thereof since the other inputs to both NOR gates 94 and 123 do not change. The "0" output of NOR gate 40 on terminal 90 is also presented through terminal 98 and conductor 102 to the left hand input of NOR gate 104 which now changes its output from a "0" to a "1" and thus produces a "0" signal on conductor 134 after inverter 132. With a "0" input to latch 136, latch 136 is caused to hold the value that it had at time $T_5$ as can be seen by the horizontal dashed line at a level of about 4 in Graph 412 of FIG. 3.

The "0" output of NOR gate 40 appearing at terminal 90 is also presented to inverter 100 so that its output on conductor 106 changes to a "1" but since the autofocus signal from terminal 14 is still a "1", the output of NOR gate 108 does not change and remains a "0".

A second effect the closing of this window switch has is that the "1" signal on conductor 32 operates through conductor 50 and capacitor 52 to produce a temporary "1" signal at terminal 53 and on conductor 54. Thus for a short period of time, the signal on conductor 54 will be a "1" thus changing the output of NOR gate 55 to a "0" for a brief period of time. This "0" signal on conductor 120 causes counter 121 to reset to "0" as can be seen in the full ine curve of Graph 412 in FIG. 3. It is also seen that almost immediately after being reset, counter 121 begins counting again and this is due to the fact that shortly after the "1" pulse on conductor 54 occurs, this signal will return to a "0" and the output of NOR gate 55 will again return to a "1" causing counter 121 to begin counting.

The final effect of the closure of the window switch is that the "1" signal on conductor 32 is presented via terminal 44 and conductor 46 to the upper terminal of NAND gate 48, which now changes its output from a "1" to a "0" on conductor 110. Although this "0" signal is now presented to the lower terminal of NOR gate 112, there is no further change since the upper input of NOR gate 112 remains a "1" from the autofocus terminal 14.

Thus, at time $T_5$, the major effect of the system is to cause latch 136 to hold the value which it had previously obtained at time $T_5$ and to cause counter 121 to reset to "0" and begin counting again.

At time $T_6$, the correlation signal has again dipped to a low and has risen to a level of the previous peak it had reached at time $T_4$ and, accordingly, the autofocus signal again changes from a "1" to a "0", as seen in Graph 406 of FIG. 3. This "0" signal from terminal 14 of FIG. 2 is presented to NOR gate 108 but since the output of NOR gate 40 on terminal 90 is now a "0" the signal on conductor 106 is a "1" and the output of NOR gate 108 does not change with changes in the autofocus signal on terminal 14. Accordingly, the output of NOR gate 108 remains a "0" and the output of NOR gate 55 remains a "1" so that counter 121 continues counting regardless of changes in the autofocus signal.

The basic change produced by this change in the autofocus signal is the change from a "1" to a "0" as the input at the upper terminal of NOR gate 112. NOR gate 112 now receives two "0" signals and, accordingly, its output becomes a "1". With a "1" at the terminal 122, NOR gate 123 now receives a "1" as the signal to its lower terminal, thus changing the output of NOR gate 123 to a "0". When this occurs, the two input terminals of NOR gate 94 become "0"'s, and the output of NOR gate 94 becomes a "1" and the latch circuit composed of NOR gates 94 and 123 has now changed output and remains in a stable condition. The "1" at the output of NOR gate 94 on terminals 142 and 146 produce no change in output of NOR gate 84 of NAND gate 80 because the lower input terminal of NOR gate 84 remains a "1" while the lower input terminal of NAND gate 80 remains a "0".

The "1" signal appearing at the output of NOR gate 112 on terminal 122 is also presented to the right hand input terminal of NOR gate 104 via conductor 124. NOR gate 104 had previously been receiving two "0" signals and so its output now changes from a "1" to a "0" on conductor 130. The signal on conductor 134 after inverter 132 thus changes to a "1" and with a "1" input to latch 136, latch 136 is caused to again load from and follow counter 121. This is seen in FIG. 3 by the dashed line of Graph 412 moving up to the level of the full line indicating that latch 136 is now being updated by the counter in counter 121.

At time $T_7$, the correlation signal has again reached a peak which, in the present example, is the highest peak and thus the peak which indicates the best correlation or proper focus position for the system. The reaching of a new peak in the correlation signal causes the autofocus signal to again change from a "0" to a "1" as seen by Graph 406 of FIG. 3. The change to a "1" at terminal 14 of FIG. 2 again produces a "1" signal to the right hand input of NOR gate 108 but, as mentioned previously, with a "1" signal on conductor 106 after the window switch closure, the output of NOR gate 108 will not change. Accordingly, at time $T_7$, the output of NOR gate 55 remains a "1" and counter 121 continues counting.

The "1" signal on conductor 114 from terminal 14 is presented to the upper input terminal of NOR gate 112 which was previously receiving two "0" signals. Accordingly, the output of NOR gate 112 becomes a "0" at terminal 122. The change to a "0" as the input to the lower terminal of NOR gate 123 produces no change in the output of this NOR gate since its upper input terminal is still receiving a "1" signal. However, the change to a "0" signal on conductor 124 now produces two "0" signals to NOR gate 104, thus producing a "1" signal on conductor 130 and a "0" signal on conductor 134 after inverter 132. A "0" signal on conductor 134 causes latch 136 to again hold the count and, accordingly, as seen by the horizontal dashed line curve of Graph 412, the latch 136 holds the value that it had at time $T_7$ at about a 10 level. This signal has a value which is representative of the highest correlation peak and, as will be shown hereinafter, is used to provide the correction signal for the system.

At time $T_8$, counter 122 has counted up to its maximum value of 15, at which time a "0" signal will appear on conductor 236 at the output of counter 121 which signal is presented to the lower input terminal of NAND gate 224 and, as explained earlier, the output of NAND gate 224 will be a "1" on conductor 226 and the signal on conductor 230, after inverter 228, will be a "0". The "0" on conductor 230 produces a signal to counter 121 which stops it counting and, accordingly, counter 121 maintains the count it had at time $T_8$ until it is subsequently reset by a zero signal on line 120.

At time $T_9$, the mirror 3 of FIG. 1 has completed its scan from near to far and, accordingly, the "sync" switch closes thus producing a "0" signal at "sync" terminal 12 and on conductor 26 of FIG. 2. This "0" on conductor 26 causes the signal on conductor 34 to become a "0" and the signal on conductor 36 to become a "1".

The change from a "1" to a "0" on conductor 34 changes the output of NAND gate 48 from a "0" to a "1" and this signal is presented via conductor 110 to the lower input terminal of NOR gate 112. However, since the autofocus signal is still a "1", the output of NOR gate 112 does not change and remains a "0".

The change from a "0" to a "1" signal on conductor 36 causes the lower input terminal of NOR gate 40 to receive a "1" signal but since the window switch closure, the upper terminal of NOR gate 40 has been receiving a "1" signal and, accordingly, this NOR gate's output does not change and remains at "0".

The "1" signal on conductor 36 is fed via conductor 64 to capacitor 68 and for a short period of time thereafter the signal on terminal 70 becomes a "1". This "1" pulse at terminal 70 causes the lower input terminal of NAND gate 80 to become a "1" thus, for a short period of time, producing a "0" on conductor 154 and a "1" input to the lower terminal of NOR gate 158 after inverter 156. The upper terminal of NOR gate 158 has been receiving a "1" signal and, accordingly, the output of NOR gate 158 does not change and remains a "0". Under other circumstances, that is, when the focus error is such that the lens has to be driven from "far" to "near", the change in input to NOR gate 158 might cause the latch circuit comprising NOR gates 152 and 158 to change states so as to produce a "1" output from the NOR gate 172. However, in the present case, the focus error is in such a direction that the lens must move from near to far and, accordingly, the lower NOR gate 176 remains energized to produce a "1" output.

Shortly after the time that the "1" signal is presented to capacitor 68, the signal at terminal 70 returns to a "0" so that the lower input terminal of NAND gate 80 again receives a "0". This changes the output of NAND gate 80 back to a "1" and changes the signal on the lower input terminal of NOR gate 158 after inverter 156 back to a "0". This, however, does not produce any change in the output of NOR gate 158 since its upper terminal is still receiving a "1".

The change back to a "0" on terminal 70 causes a "1" signal to appear on conductor 82 after inverter 76 and, accordingly, the lower input terminal of NOR gate 84 again receives a "1". This, however, produces no change in output of NOR gate 84 since its upper terminal is still receiving a "1" from terminal 146. Accordingly, the motor will continue to run in a direction from near to far as above explained.

The final change that occurs upon the closure of the sync switch is that the "1" signal at terminal 66 is now presented via conductor 86 to latch 88. A "1" input to latch 88 causes it to load or receive the count in latch 136 and be updated thereby. Accordingly, the count in latch 88 becomes equal to the count in latch 136 as is seen by the dash-dot line moving from a position from Graph 412 of FIG. 3 of about the level of 12 down to that of latch 136 at about the level of 10 at time $T_9$. It is the signal in latch 88 that is now indicative of the magnitude of error between the desired correlation position and the position of the lens and which will be used for comparison by comparator 220 so that the rest of the system can go back to operating in accordance with the signals produced by the next scan without effecting the output of the comparator 220 which operates to drive the motor. Thus, it is seen that the motor may drive during the active scan and the return scan and, in fact, can be moving continuously, which is of great advantage particularly for large errors. It is also seen that the motion of the motor is independent of the length of time taken for the return scan and, accordingly, this may be compressed as is seen by the fact that the time between $T_9$ and $T_{10}$ in FIG. 3 is much less than that between $T_1$ and $T_9$. This allows a longer active scan for the same total overall time period between two successive scans, thus improving the response of the system and its accuracy in much the same way as was described in connection with the above copending application. It should be noted, however, that it is not necessary for the active and return scans to be of unequal length or with the active scan being longer and with the present system they may be set at any ratio desired by the system designer by changing the characterization of cam 5 in FIG. 1.

For an understanding of how the comparator 220 produces a signal to drive motor 380, reference should be had to FIG. 4. In FIG. 4, the output of counter 204 is shown as a saw-tooth waveform in which there are about six peaks for every peak of the scan position shown in the upper Graph 420. As mentioned, this is a representative quantity and actually there would be many peaks of counter 204 occurring during this time. The output of latch 88 is shown as the dash-dot line in Graph 422 and it is seen that latch 88 signal crosses the tops of the peaks of the output of counter 204 so that the count in counter 204 is greater than the count in latch 88 for a short period of time on each peak on the left hand side of FIG. 4.

Comparator 220 operates so as to produce a "0" signal on conductor 310 whenever the count from counter 204 is less than the count in latch 88 and to produce a "1" signal on conductor 310 whenever the count from counter 204 is greater than the count in latch 88. This is seen by the Graph 424 being a pulsating square wave and in which the width of the pulses at the "1" lever are smaller than the width of the pulses at the "0" level. This is because on the left hand portion of the Graphs of FIG. 4 the count in latch 88 is relatively high and thus the count from counter 204 is greater than the count in latch 88 for only a small portion of the time.

It will be noticed in FIG. 4 that as the signal progress towards the right hand side of FIG. 4, the width of the "0" pulses begins decreasing and the width of the "1" level pulses begins increasing. This occurs because motor 380 of FIG. 2 continues driving the lens of the system towards the proper focus position so that during each successive scan cycle, the error that is ultimately stored in latch 88 becomes smaller and smaller. Thus, under the second shown scan position of FIG. 4, the latch 88 output is shown to have dropped slightly which results in a situation where the count from counter 204 is greater than the count from latch 88 for a larger portion of the time than was the case first described. And, again, under the third scan cycle, the level of signal in latch 88 has again dropped to where the count from counter 204 is greater than the count in latch 88 for what appears to be more than half of the entire count. Finally, under the fourth scan position, it is seen that the signal in latch 88 has dropped to a point where the count of counter 204 is less than the count of latch 88 for only a very short portion of the time. This will continue throughout successive cycles until the error has been eliminated or, as will be explained hereinafter, has reached the level where a minimum output signal occurs from comparator 220.

Thus, the signal appearing on line 310 at the output of comparator 220 is a pulsating "0" signal, the width of which decreases as the error becomes smaller and smaller. Accordingly, NOR gate 176 produces a "1" output for less and less of the cycle time as the error becomes less and less, and transistor 236 is on less and less of the time as the error gets smaller and smaller. The end result of this is that motor 380 will be energized for smaller portions of each cycle as the error becomes less and less and thus produces a drive which is very rapid at the larger errors but becomes slower as the error becomes smaller and smaller, or, in other words, a proportional type system described in the above-mentioned copending application Ser. No. 804,111.

The final change in the system occurs at time $T_{10}$, when the mirror 3 of FIG. 1 has returned to its initial starting position. At some time in its return towards the initial starting position, the window switch closed and when it has reached its initial starting position, the sync switch closes with the result that at time $T_{10}$, the output from terminals 10 and 12 both again are "0"'s and the circuit is in the same condition as it was at time $T_1$ above described. From this point on, the cycle repeats until the system has arrived at the proper focus position and by use of a minimum signal to be described, oscillates about the focus position thereafter.

In order to prevent static friction in the system, it may be desirable to cause motor 380 to slightly oscillate about the proper focus position and this may be accomplished by having counter 121 reset to some minimum count higher than zero so that the system never arrives at an exactly balanced condition but rather always produces some minimum small signal that will cause motor 380 to drive.

The introduction of a minimum signal to counter 121 may be accomplished through the use of terminals 244, 246, 248 and 250, which can be set at any binary number desired. For example, assume that a count of 1 were desired at all times in the system, then terminal 250 would have a "1" signal applied thereto while terminals 244, 246 and 248 would have a "0" signal applied thereto. If the minimum level of count were desired to be a "2", then the terminal 248 would have a "1" applied thereto, while terminals 244, 246 and 250 would have a "0" applied thereto. When a signal of a predetermined count is introduced via terminals 244, 246, 248 and 250, then when a reset signal is applied to counter 121 via conductor 120, the count in counter 121 will not go to zero but will rather go to whatever the count supplied by terminals 244-250. Under such circumstances and assuming that the lens of the system were at the proper focus position, then the signal which appeared in latch 136 would be whatever the count in counter 121 was at a minimum for the balance condition and thus the count in latch 88 would be updated each cycle to that minimum count and comparator 220 would compare that minimum count with the signal from counter 204 so as to produce a pulsating signal with a minimum pulse width on the zero portion thereof. This would then produce a turning on of either transistor 322 or 324 depending on the duration of error and a driving of motor 380 at a very slight rate past the proper focus position. As soon as the motor drove the lens onto the other side of the proper focus position, the circuit would operate to cause the other of the transistors 322 or 324 to turn on which, as described above, would cause motor 380 to slightly move in the opposite direction.

While the apparatus has been shown to utilize latch 88 and comparator 220 for producing a signal so that the motor can drive during portions of the active scan, in some cases this may not be necessary, in which case latch 88 could be eliminated and the count in latch 136 being used with comparator 220 to produce the output. Furthermore, both latch 88 and comparator 220 could be eliminated if an "up-down" counter were employed, in which case, either the output from latch 136 indicative of the error could be used to load the up-down counter, which would then count down from the level of latch 136 to a zero or minimum position to drive motor 380 in the proper direction or counter 121 itself could be an up-down counter counting up to the error level and then counting down to drive motor 380.

Accordingly, it should be recognized that many obvious changes and alternatives to the exact apparatus described in connection with the preferred embodiment can be made by those skilled in the art and I do not wish to be limited by the specific disclosures used in connection with the preferred embodiment. For example, while I have shown counter 121 being driven at 1/16 the rate of counter 204, the ratio can be made any value desired, equal or even with counter 121 operating at a greater rate than counter 204. Likewise, while the counters have been shown with four stages each, other numbers of stages may be used. Accordingly, I intend to be limited only by the following claims:

I claim:

1. Apparatus for use with an autofocus system which includes an optical element to be positioned proximate the desired focus position, the system producing first, second and third output signals, each of which may alternate between first and second states during operation of the system, comprising:

a first counter having a reset input and an output;

a first latch having a load input, a second input and an output;

means connecting the reset input of said first counter to the system so that said first counter is reset to its base whenever the first output signal changes from its first state to its second state and so that, prior to a change in the second output signal from its second state to its first state, said first counter begins counting whenever the third output signal changes from its first state to its second state but is reset again whenever the third output signal changes from its second state back to its first state and, subsequent to a change in the second output signal from its second state to its first state, said first counter is reset to its base and starts counting without being again reset until at least the first output signal changes from its second state back to its first state;

means connecting the second input of said first latch to the system and connecting the load input of said latch to the output of said first counter so that prior to a change in the second output signal from its second state to its first state, said first latch is loaded from and follows the count of said first counter but when there is a change in the second signal from its second state to its first state, said first latch holds its count until either (i) the third output signal changes to its first state, in which case said first latch is again loaded from and follows said first counter until there is a subsequent change in the third output signal to its second state, at which time said first latch again holds its count or (ii) a change in the first signal from its second state to its first state; and motive means connected to the output of said first latch and to the optical element and operable to move the optical element in accordance with the count in said first latch when the first signal changes from its second state to its first state.

2. Apparatus according to claim 1 including:

direction means connected to the system and to said motive means and operable to cause the movement of the optical element by said motive means to be in a first or opposite direction depending upon whether the last change of the third output signal from its first state to its second state occurs before or after the second output signal changes from its second state to its first state.

3. Apparatus according to claim 1 wherein a second latch having a load input, a second input and an output, is connected between said motive means and said first latch with the load input of said second latch being connected to the output of said first latch, with the second input of said second latch being connected to the system and with the output of said second latch being connected to said motive means, said second latch being loaded with the count of said first latch whenever the first output signal changes from its second state to its first state whereby said motive means is driven in accordance with the count in said second latch.

4. Apparatus according to claim 3 including:

a second counter having an output and wherein a comparator having first and second inputs and an output is connected between said motive means and said second latch with the first input of said comparator being connected to the output of said second latch, the second input of said comparator being connected to the output of said second counter and the output of said comparator being connected to said motive means whereby said motive means operates in accordance with the output of said comparator.

5. Apparatus according to claim 1 including means connected to said first counter and operable to provide a signal to said first counter to preset the base from which said first counter begins counting and so as to apply a signal to drive said motive means even when the optical element is at the desired focus position.

6. Apparatus for use with an autofocus system which includes an optical member to be positioned so as to provide a focused image of an object in a field of view, radiation detecting means; scanning means operable to move in an active portion of a scan between first and second positions and then in a return portion of the scan back to the first position so as to transmit radiation from the field of view to the radiation detecting means with one position of said scanning means between the first and second positions corresponding to the position of the optical member, correlation circuitry connected to the radiation detection means and producing a correlation signal which varies in magnitude during the active portion of the scan to produce one or more extremums, the greatest of which occurs when the scanning means is in a position corresponding to the desired focus position, and circuit means producing first, second and third outputs, the first output changing from a first state to a second state when the scanning means begins the active portion of a scan and returning to the first state at the end of the active portion of the scan, the second output being in a second state during the active portion of a scan until the scanning means is in the one position and thereafter changing to a first state and the third output changing from a second state to a first state whenever an extremum larger than a previous extremum is approaching, and which changes from the first state back to the second state whenever an extremum in the correlation signal larger than a previous extremum is reached, the last transition from the first state to the second state being indicative of the desired focus position, comprising:

a first counter having a reset input and an output;
   a first latch having a load input, a second input and an output;
   means connecting the reset input of said first counter to the system so that said first counter is reset to a base value whenever the first output signal changes from its first state to its second state and so that, prior to a change in the second output signal from its second state to its first state, said first counter begins counting whenever the third output signal changes from its first state to its second state but is reset again to the base whenever the third output signal changes from its second state back to its first state and, subsequent to a change in the second output signal from its second state to its first state, said first counter is reset to its base and starts counting without being again reset until at least the first output signal changes from its second state to its first state;
   means connecting the second input of said first latch to the system and connecting the load input of said first latch to the output of said first counter so that prior to a change in the second output signal from its second state to its first state, said first latch is loaded from and follows the count of said first counter but when there is a change in the second signal from its second state to its first state, said first latch holds its count until either (i) the third output signal changes to its first state, in which case said first latch is again loaded from and follows said first counter until there is a subsequent change in the third output signal to its second state, at which time said first latch again holds its count or (ii) a change in the first signal from its second state to its first state; and
   motive means connected to the output of said first latch and to the optical element and operable to move the optical element in accordance with the count in said first latch when the first signal changes from its second state to its first state.

7. Apparatus according to claim 6 including:
   direction means connected to the system and to said motive means and operable to cause the movement of the optical element by said motive means to be in a first or opposite direction depending upon whether the last change of the third output signal from its first state to its second state occurs before or after the second output signal changes from its second state to its first state.

8. Apparatus according to claim 6 wherein a second latch having a load input, a second input and an output is connected between said motive means and said first latch with the load input of said second latch being connected to the output of said first latch, with the second input of said second latch being connected to the system and with the output of said second latch being connected to said motive means, said second latch being loaded with the count of said first latch whenever the first output signal changes from its second state to its first state whereby said motive means is driven in accordance with the count in said second latch.

9. Apparatus according to claim 8 including:
   a second counter having an output and wherein a comparator having first and second inputs and an output is connected between said motive means and said second latch with the first input of said comparator being connected to the output of said second latch, the second input of said comparator being connected to the output of said second counter and the output of said comparator being connected to said motive means whereby said motive means is driven in accordance with the output of said comparator.

10. Apparatus according to claim 6 including means connected to said first counter and operable to provide a signal to said first counter to preset the base from which said first counter begins counting so as to supply a signal to drive said motive means even when the optical means is at the desired focus position.

* * * * *